US011200742B1

(12) United States Patent
Post et al.

(10) Patent No.: US 11,200,742 B1
(45) Date of Patent: Dec. 14, 2021

(54) AUGMENTED REALITY-BASED INTERACTIVE CUSTOMER SUPPORT

(71) Applicant: UIPCO, LLC, San Antonio, TX (US)

(72) Inventors: Nathan Lee Post, Rockport, TX (US); Carlos JP Chavez, San Antonio, TX (US); Deborah Janette Schulz, San Antonio, TX (US); Ashley Raine Philbrick, San Antonio, TX (US); Eric David Schroeder, San Antonio, TX (US); Gabriel Carlos Fernandez, San Antonio, TX (US); Snehal Desai, Richardson, TX (US); Rachel Elizabeth Csabi, Frisco, TX (US); Ruthie D. Lyle, Durham, NC (US); Courtney St. Martin, Duluth, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/184,306

(22) Filed: Feb. 24, 2021

Related U.S. Application Data

(60) Provisional application No. 62/983,182, filed on Feb. 28, 2020.

(51) Int. Cl.
*G06T 19/00* (2011.01)
*G06K 9/00* (2006.01)
*G02B 27/01* (2006.01)

(52) U.S. Cl.
CPC .......... *G06T 19/003* (2013.01); *G02B 27/017* (2013.01); *G06K 9/00315* (2013.01); *G06T 19/006* (2013.01); *G02B 2027/014* (2013.01); *G02B 2027/0138* (2013.01)

(58) Field of Classification Search
CPC . G06T 19/003; G06T 19/006; G06K 9/00315; G02B 27/017; G02B 2027/0138; G02B 2027/014; G06Q 30/016
See application file for complete search history.

(56) References Cited

U.S. PATENT DOCUMENTS

| | | | | |
|---|---|---|---|---|
| 2011/0066938 | A1* | 3/2011 | Nageswaram | G06Q 10/107 715/706 |
| 2011/0075819 | A1* | 3/2011 | Bruce | H04M 3/5191 379/88.04 |
| 2013/0212228 | A1* | 8/2013 | Butler | H04L 67/38 709/219 |
| 2019/0244425 | A1* | 8/2019 | Koohmarey | G06T 19/006 |

* cited by examiner

*Primary Examiner* — Jeffery A Brier
(74) *Attorney, Agent, or Firm* — Plumsea Law Group, LLC

(57) ABSTRACT

A method and system of providing guidance and information to customers by presentation of a virtual avatar. The virtual avatar is controlled in real-time by a remote customer service agent. The method includes sharing images of a physical space with the customer service agent, and enabling the customer service agent to project a virtual avatar on the physical space such that the virtual avatar appears to interact and move through the physical space. The dynamic projection of the virtual avatar is received by the customer as an augmentation of their own view of the physical space.

20 Claims, 13 Drawing Sheets

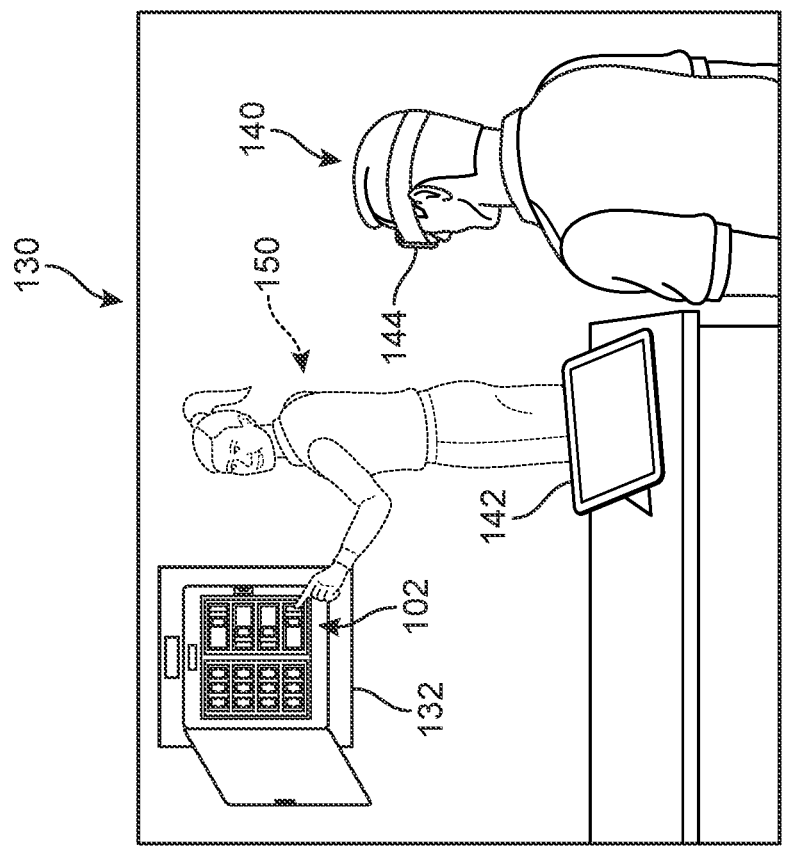
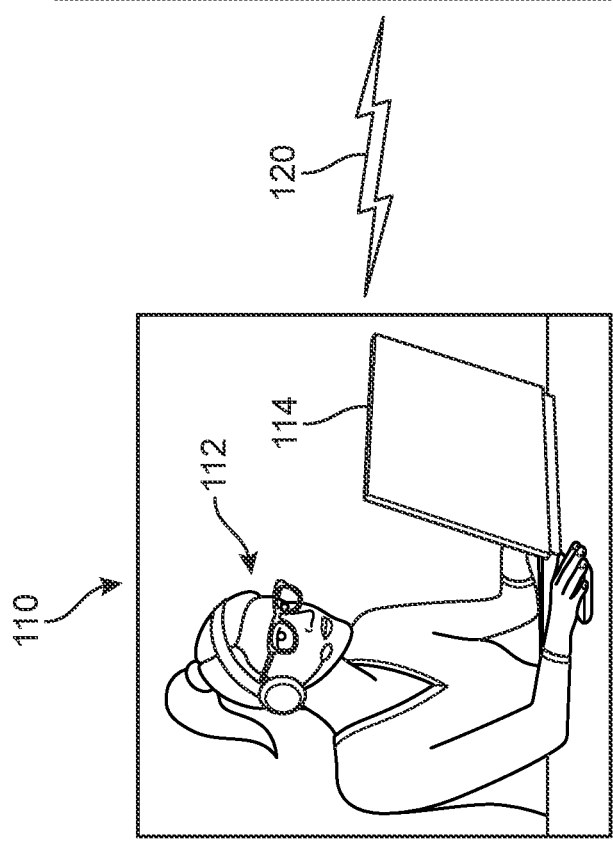
FIG. 1

AUGMENTED REALITY-BASED INTERACTIVE CUSTOMER SUPPORT

CROSS-REFERENCE TO RELATED APPLICATION

This application claims the benefit of U.S. Provisional Patent Application Ser. No. 62/983,182 filed on Feb. 28, 2020 and titled "Augmented Reality-Based Interactive Customer Support", the disclosure of which is incorporated by reference in its entirety.

TECHNICAL FIELD

The present disclosure generally relates to an augmented reality-based method of providing information to end-users, and more specifically to offering immersive real-time virtual guidance to a customer.

BACKGROUND

Customer support and information centers, or call centers, are commonly set up by government agencies, organizations, and business operations to handle customer inquiries and to provide support for their products and services. For example, a customer support center may be a location with a few persons who handle incoming and outgoing customer calls. For larger organizations, the support center may be a dedicated facility with a large group of support personnel with advanced computers and telecommunication equipment, where the employees make calls and receive incoming customer inquiries. In some cases, a support center may handle customer calls concerning the repair or maintenance of their goods or services, or to otherwise interact with their customers. There are a wide range of applications that facilitate the activities of the support centers, such as sales applications, including order entry and reservation applications, financial services applications, including funds transfer and stock transactions, and customer service applications, including technical support, repair and claims handling.

However, while such remote communication and support centers are less expensive to operate, customers often describe such interactions as impersonal, and are generally rated lower in customer satisfaction. Customers typically prefer to interact with an actual, visible, support person when experiencing a product or service issue, rather than being asked to respond to voice directions on a telephone or selecting user options on a computer screen. Although some support centers have sought to improve the level of customer attention by employing interactive web applications like instant messaging, these interfaces continue to lack an 'in-person' dynamic presence that most customers prefer when they contact a customer support center.

There is a need in the art for a system and method that addresses the shortcomings discussed above.

SUMMARY

In one aspect, a method for conveying interactive guidance to an end-user includes presenting to the end-user, on a display of a first computing device, a view of a first scene corresponding to a first area of a physical space, the first area including a first real object, and presenting a virtual avatar on the display, the virtual avatar being overlaid on a portion of the view of the first scene, where the virtual avatar is controlled by a remote human agent via a second computing device. The method also includes receiving a first command from the remote human agent to move the virtual agent from a first pose to a second pose, and modifying, in response to the first command, the presentation of the virtual avatar on the display such that the virtual avatar appears to move nearer to the first real object at a first time. The method further includes receiving and presenting a first communication from the remote human agent regarding the first real object around the first time.

In another aspect, a method for generating guidance using a virtual avatar includes receiving, at a first computing device, one or more images of a first scene corresponding to a first area of a physical space from a second computing device, the first area including a first real object, and mapping a representation of the first scene based at least in part on the received images. The method also includes presenting the representation of the first scene on a first display of a first computing device and overlaying a projection of a virtual avatar on a portion of the representation of the first scene, where the virtual avatar is being controlled by an end-user who is remote relative to the physical space. In addition, the method includes receiving, at the first computing device, a first command to move the virtual avatar from a first location near the first real object to a second location further from the first real object, and moving, in response to receiving the first command, the virtual avatar from the first location to the second location.

In another aspect, a system for alerting a driver of a vehicle includes a processor and machine-readable media including instructions which, when executed by the processor, cause the processor to present to the end-user, on a display of a first computing device, an image of a first scene corresponding to a first area of a physical space, the first area including a first real object, as well as present a virtual avatar on the display, the virtual avatar being overlaid on a portion of the first scene, wherein the virtual avatar is controlled by a remote human agent via a second computing device. The instructions further cause the processor to receive a first command from the remote human agent to move the virtual agent from a first pose to a second pose. In addition, the instructions cause the processor to modify, in response to the first command, the presentation of the virtual avatar on the display such that the virtual avatar appears to move nearer to the first real object at a first time, and receive and present a first communication from the remote human agent regarding the first real object around the first time.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1 is a schematic process of providing guidance to a customer through an augmented reality experience, according to an embodiment;

DESCRIPTION OF EMBODIMENTS

Figure 2:
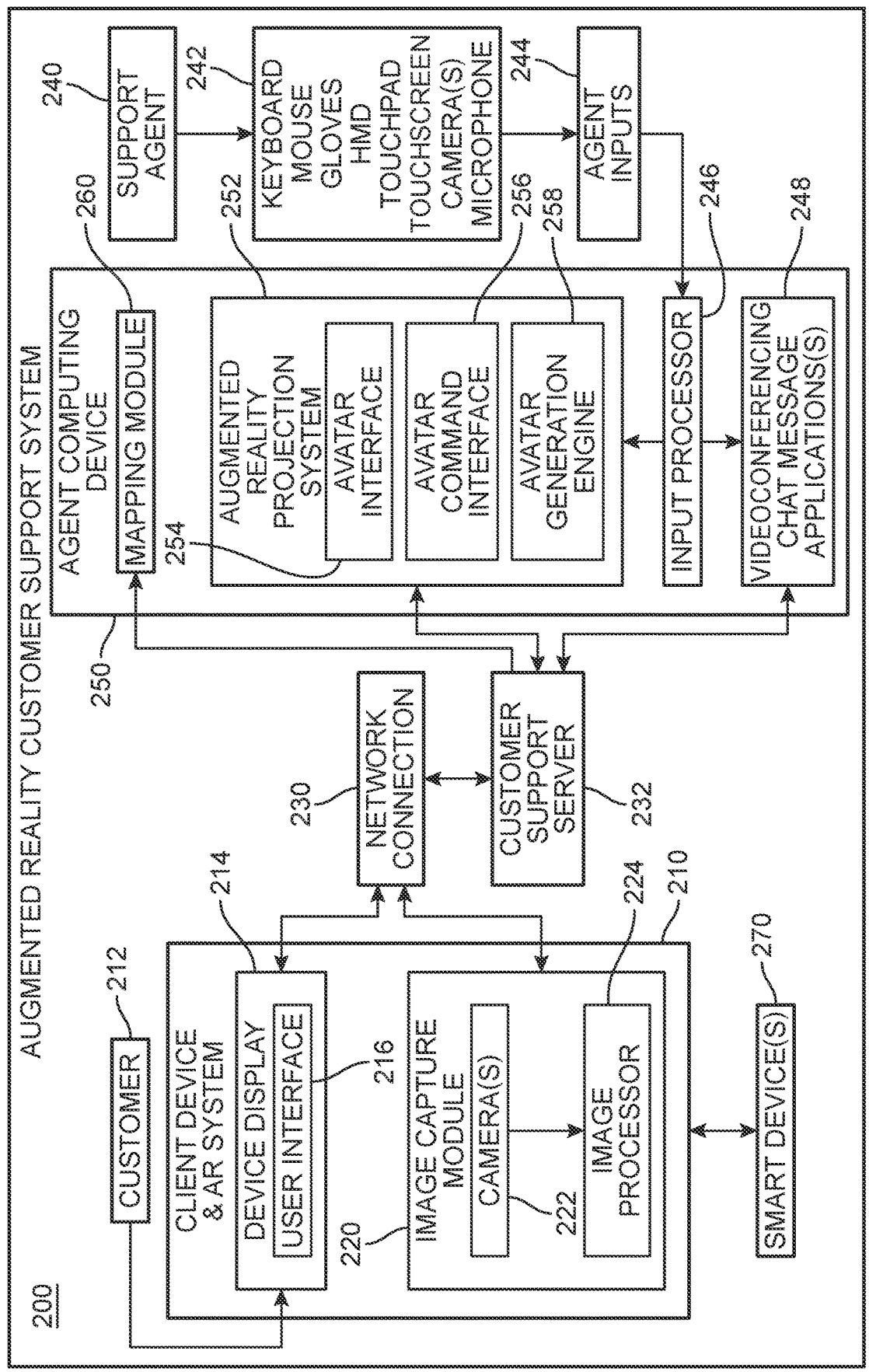
FIG. 2 is a schematic diagram of a system for providing guidance to a customer using an augmented reality medium, according to an embodiment.

The embodiments provide a system and method for responding to queries from customers by the presentation of a virtual avatar that serves as a representation of a customer support agent. Specifically, the embodiments provide a system and method for conveying information from a customer service representative through the manifestation of a dynamic, visual, and interactive virtual avatar using an augmented reality (AR) enabled computing device. The service representative is who is at a location that is remote relative to the customer's location, such as a call center. As will be discussed in greater detail below, the proposed systems and methods facilitate interactions with a customer by presentation of virtual object(s). As used herein, the term "customer" should be understood tor refer to any end-user or person requesting or receiving assistance or other communications from a remote agent. The customer can view at least one aspect of the interaction through an AR-enabled device. For example, the customer may wear a head-mounted display (HMD) system (also referred to herein as smartglasses, smartgoggles, augmented reality (AR) glasses, or virtual reality (AR) glasses) or access and view a display for another computing device such as a mobile device that are configured to connect to a network and receive content from the remote representative. As part of this arrangement, the AR-enabled device can receive information in real-time from the remote representative in order to determine what type of virtual object to display and the corresponding pose and appearance of the virtual object.

Referring now to FIG. 1, for purposes of introduction, a first user 140 of a first AR-enabled computing device ("first device") 144 is standing in a first physical space 130. The first device 144 in this case is an HMD system shown in the form of a pair of smartglasses. The first device 144 is configured to receive and send data from/to a nearby client computing device ("client device") 142 that has internet connectivity. The client device 142 can include an electronics unit comprising a plurality of different components, such as a user interface component (e.g., a touchscreen display, keyboard, mouse, microphone, etc.), a sensor unit, a user interface module, a processor, and/or a communication module. In some embodiments, the client device 142 may also include a speaker. In this example, client device 142 is a computer tablet.

Furthermore, the client device 142 may include an on-board computing system including one or more processors and memory. Memory may comprise a non-transitory computer readable medium. Instructions stored within memory may be executed by the one or more processors. The on-board computing system may be configured to receive and analyze data from various sensors associated with the sensor unit in the client device 142 or data that is communicated from the first device 144 to the client device 142. In different examples, the sensor unit includes a variety of sensors. The sensors can include one or more of a gyroscope, an accelerometer, a light sensor, an air pressure sensor, a microphone, a speaker, a touch-sensitive sensor, among others. In some cases, the client device 142 may also include a navigation system equipped with a GPS receiver that can receive GPS information or other receivers capable of receiving global or local positioning information.

A communication module may allow the client device 142 to communicate wirelessly. In different embodiments, the client device 142 may communicate with a mobile computing device, wireless devices, and/or with networked computers, for example. In FIG. 1, the communication module is connected to the HMD system of first device 144. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

Although two different devices are presented in FIG. 1 for purposes of illustration, it should be appreciated that in other embodiments the first device 144 may be configured to be self-contained, communicate directly over a network, include similar components as described herein for client device 142, and provide the full functionality needed for the communication session, including the presentation of the virtual avatars described herein.

As depicted in FIG. 1, an HMD system as represented by first device 144 allows a user to view a displayed image or a see-through view of the scene in front of the user. While FIG. 1 presents an HMD system comprising a pair of smartglasses, other embodiments can include another wearable computing device such as a smart helmet, smart visor, smart faceshield, smart contact lenses, or other head-mounted display devices. The HMD system is configured to present a combined image that includes both a displayed (virtual) image and a see-through view of the physical environment or real-world scene in front of the user, where the displayed image is overlaid on the see-through view. In different operational modes, an HMD can present the displayed image so that the area of the displayed image is transparent, semitransparent or opaque. In other words, when operating in a transparent mode, the see-through view of the real-world scene is unblocked and an overlaid displayed image can be provided with low contrast. Similarly, when operating in the semitransparent mode, the see-through view of the real-world scene is partially blocked and an overlaid displayed image can be provided with higher contrast. Finally, when operating in the opaque mode, the see-through view of the real-world scene is fully blocked and an overlaid displayed image can be provided with high contrast.

As will be discussed further below, in different embodiments, some HMDs can also provide a see-through display for an augmented reality (AR) view in which real-world scenes are visible to a user but additional image information, such as a dynamic virtual avatar, is overlaid on the real-world scenes. In one embodiment, there can be more than one area in which the display of images over the real-world view occurs. Thus, a displayed image can be viewed by a user at the same time that a view of the scene from the surrounding environment can be viewed. The displayed image (virtual projection) and the real-world view can be viewed as a combined image where the displayed virtual image is overlaid on the see-through view that serves as a background or landscape for the virtual avatar to explore. In other embodiments, the real-world scene can be presented as an image being captured live by a camera connected to the client device, and the virtual avatar is then superimposed on the streaming, captured image(s) and is further able to interact with the real objects in the captured image(s).

In most cases, the HMD system includes a wearable frame with lenses that have display areas and clear areas, or display areas for the presentation of an image and projection of virtual objects cony the image. The HMD system will also have image sources and associated optics to present image light from the image source to the display areas. When worn, the frame is supported on the user's head with frame arms ("arms"). In some embodiments, the arms can contain electronics such as a processor to drive the displays and peripheral electronics such as batteries and wireless connection(s) to other information sources (for example, through Wi-Fi, Bluetooth, cellular or other wireless technologies). One or more cameras can be included to capture images of the surrounding environment. The locations of the various components in the HMD system can vary in different embodiments. The lens can also include controllable darkening layers in the display areas configured to change the opacity behind the respective portions of the display area, thereby enabling changes in operating mode between transparent, semi-transparent and opaque in the areas where images are displayed. An HMD can provide image information to one eye of the user or both eyes of the user.

A wide variety of HMD systems and image sources to provide images for display are known in the art including organic light-emitting diode (OLED) displays, quantum dot based light emitting diodes (QLED) displays, liquid crystal displays (LCDs), or liquid crystal on silicon (LCOS) displays, among others. In addition, the image sources can be microprojectors or microdisplays with associated optics to present the image light to the display areas for viewing by human eyes. In different embodiments, the optics associated with the image sources relay the image light from the image sources to the display areas, and can include refractive lenses, reflective lenses, mirrors, diffractive lenses, and/or holographic lenses or waveguides.

As noted above, in some embodiments, the head mounted display may be semitransparent, thereby enabling the user to view the real-world scene beyond the display, with projected images appearing superimposed or overlaid upon the background scene. Thus, the user may view a scene through a partially transparent HMD where real world objects, like a desk, a table and walls, are partially or fully visible through the HMD which also places virtual objects within the visible scene. This provides a user with an augmented reality experience in which the user can see the "real world" through the display while simultaneously viewing virtual objects that appear to be moving through or adjacent to real locations and/or surfaces of real objects.

In FIG. 1, the first user 140 is able to view real-world objects such as a control panel 132 on a far wall of the room corresponding to first physical space 130. The first physical space 130 can refer to any physical environment such as a room in an office, residence, or other building, as well as open or outdoor spaces. In this case, the first physical space 130 is a room in an office, and the first user 140 is gazing in the direction of the control panel 132 through the display of his or her HMD system. During this time, the first user 140 is also engaged in a communication session with a first remote service agent ("first agent") 112 who is located outside of the first physical space 130, for example, at a support center location 110. The first agent 112 is equipped with a second computing device ("second device") 114 through which she is able to send data to and receive data from first user 140 across a network 120. In this encounter, the first agent 112 utilizes the communication support software available through her second device 114 to view images captured by cameras associated with first device 144 and/or client device 142 at first physical space 130. First agent 112 further initiates a projection of a first virtual avatar ("first avatar") 150 that is controlled by first agent 112 via second device 114. While the first avatar 150 can take any form or appearance, in this case, the first avatar 150 appears as an image of a human person of a size that generally is in proportion with the surrounding physical environment.

Thus, from the perspective of the first user 140, the first avatar 150 appears to move through the real environment of first physical space 130 as if the first avatar 150 is actually present. In this example, the first avatar 150, in response to commands from first agent 112 through second device 114, is positioned on the display of first device 144 in such a manner so as to appear to be standing adjacent or next to the control panel 132. Furthermore, during the ongoing communication session, a hand of the first avatar 150 appears to move closer and point toward a specific switch 102 on the control panel 132. Concurrent to this presentation of the first avatar 150, the first agent 112 may also be transmitting one or more types of messages to the first user 140. For example, first agent 112 can provide voice utterances that can be emitted by speakers associated with first device 144 and/or client device 142. In some embodiments, the virtual avatar can move her lips in a manner that appears to approximately correspond in timing and content to the agent's spoken utterances, suggesting that the avatar itself is the one who is speaking. In another example, first agent 112 may send text or other media to the first user 140 through a communication interface shown on the display of either or both of first device 144 and client device 142. In other words, information that is being provided to the first user 140 through less interactive mediums such as voice or text can be markedly supplemented and enhanced by the inclusion of a virtual 'face-to-face' augmented reality experience that is being controlled in real-time by a remote agent.

As noted above, organizations and businesses often provide support to customers by making available to their customers one or more member service representatives (MSRs) or other customer representatives and service agents who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items.

In order to provide the reader with a greater appreciation of the embodiments to the reader, FIG. 2 depicts an overview of an embodiment of an augmented reality customer support system ("system") 200 in which an HMD or other AR-enabled system is configured to render a projection comprising one or more virtual objects that will be shown to a customer, thereby providing an augmented reality experience that facilitates and enhances the customer support experience. As shown in FIG. 2, the system 200 includes a client device and AR system ("client device") 210 and an agent computing device 250 that are configured to communicate with one another, for example via a Wi-Fi, cellular, or other network connection 230. While the various components of system 200 are shown as residing in client device 210 and/or agent computing device 250 in FIG. 2, in other embodiments some or all components described herein can be accessed through a cloud network and stored on a cloud-based server.

In different embodiments, the client device 210 includes a device display ("display") 214 that may comprise an HMD, computer monitor, touchscreen, or other display, as well as an image capture module 220. As noted above, in some embodiments, a head mounted display may be semi-transparent, thereby enabling the user to view the real-world scene beyond the display, with projected images (such as a virtual avatar) appearing superimposed or overlaid upon the background scene. Thus, the user may view a scene through a partially transparent HMD where real world objects, like a desk, a table and walls, are partially visible through the HMD which also places virtual objects within the visible scene. In other cases (e.g., where the user is viewing the real-world around them through a more conventional display), the physical environment around them may be captured in real-time via a video camera connected to the client device 210. In another embodiment, the customer may be communicating with a support agent 240 regarding real objects or aspects in a physical environment that they are not currently located in, the real-world background with which the agent will appear to be interacting can have been previously recorded and portions of the recording played back and used while superimposing a virtual avatar on the scene.

Furthermore, at or around the same time as the avatar is being presented on the display 214, the customer 212 can receive and send information through a user interface 216 that may be presented on the device display 214. The user interface 216 and display 214 may represent a common component or may represent separate physical or functional components. In some embodiments, display 214 may be a touchscreen, allowing the customer to interact with the user interface directly by touch. The user interface may refer to an operating system user interface or the interface of one or more software applications that may run on the client device 210. In addition, when the customer launches a support application on client device 210, they may be shown an option to initiate a screen sharing function, whereby content currently being displayed on the client device 210 is transmitted to the agent computing device 250. In some embodiments, the user interface 216 can include a messaging window or other chat-space by which the support agent 240 may send text messages or other digital content. Though not shown in FIG. 2, the customer 212 can also speak with the support agent 240 via a voice calling application on client device 210, or directly through a telephone.

In order for the avatar representing support agent 240 to appear to move through and interact with the physical environment associated with customer 212, image data for the physical environment must be shared with the agent computing device 250. In different embodiments, images are captured by a camera associated with the client device 210. In some embodiments, these images are used to generate image data that a processor can analyze to estimate distances to objects in the image, while in other implementations, the client device 210 can include one or more distance measuring sensors such as a laser or sonic range finder can measure distances to various surfaces within the image. Different types of distance measuring sensors and algorithms may be used an imaged scene to measure for measuring distances to objects within a scene viewed by a user. Furthermore, more than one sensor and type of sensor may be used by client device 210 to determine distance. In the example of FIG. 2, the client device 210 includes image capture module 220, which is configured to receive various inputs from devices connected to the client device 210 such as camera(s) 222. Images captured by camera(s) 222 can be conveyed to an image processor 224 to prepare the data for use by the support agent 240 via network connection 230. These images can be captured in real-time such that the support agent 240 has a 'live view' (or live streaming) of the physical environment associated with the customer 212, or can be pre-recorded. In addition, the image content can be shared with a mapping module 260 of the agent computing device 250, as will be discussed below.

A call management or customer support server 232 can manage the distribution, transfer, and handling of various calls that come into the support center. For example, a customer may be routed via the customer support server 232 to an appropriate agent computing device associated with a particular MSR better suited to respond to the particular caller. In different embodiments, the agent device 250 can be connected to or include an internet customer interface for providing support specifically to customers or members who contact them via the Internet. The support agent 240 can refer to any person or personnel who offers the caller (or person who was called) assistance, and appears to interact with the member or other individual using a virtual avatar that is projected in a real-world scene associated with the customer. The support agent 240 can make use of any number of devices 242, such as a keyboard, mouse, VR gloves such as haptic and/or motion tracking gloves, an HMD system, touchpad, touchscreen, microphone, telephone, and/or camera(s) or other input devices to generate agent inputs 244. The input is received by an input processor 246 of the agent computing device 250, which conveys the data to either or both of a videoconferencing and chat message application(s) 248 and an augmented reality projection system 252. The videoconferencing and chat message application(s) 248 enable the traditional communication session between a customer and support agent, which can occur concurrently with the presentation of the virtual avatar. The augmented reality projection system 252 enables the virtual avatar to be presented during interactions between a customer and support agent by rendering virtual content for display via the display 214.

In different embodiments, a virtual object presented by the augmented reality projection system 252 may include, for example, text, graphics, images and 3D shapes, as well as and digital assets (documents, pictures, videos, text, television channels, movies, document word processing applications, email, video, telephone calls, social network postings, RSS feeds, and other media), as well as the virtual avatar itself. A processor for the augmented reality projection system 252 continuously updates the displayed image of the generated virtual projection to so that the virtual objects appear to move or change pose even as the customer turns their head or moves through their physical environment and/or changes position. The support agent 240 can view the real-world scene (or live stream) being transmitted from the client device 210 via an avatar interface 254 that is configured to allow the support agent 240 to manipulate the manner in which the virtual avatar appears overlaid on the real-world scene and ensure the virtual avatar responds dynamically to changes in perspective of the physical space.

As noted above, the agent computing device 250 can be provided with screen sharing image(s) of content displayed on the customer's client device 210 and/or a live feed from cameras 222 of the client device 210. In addition, the avatar interface 254 can provide one or more interaction tools by which the support agent 240 may be able to better respond to customer inquiries or requests for assistance, including but not limited to an avatar navigation tool, a drawing tool, a selection tool, a highlight tool, a magnifier tool, a pointer tool, and a control tool that can each be manifested through the appearance of the virtual avatar. In other words, if the support agent 240 chooses to select and/or point at an object in the physical environment, the virtual avatar will appear to raise their hand and point a finger at the selected object. If the support agent 240 chooses to draw a circle around an object, the virtual avatar can appear to move their arm to draw the circle. If the support agent 240 selects a real-world object or item by clicking their mouse or tapping at their screen, the virtual avatar can appear to walk toward the real-world object and come to a stop next to the real-world object. If the object is lower than the eye-level of the virtual avatar, the virtual avatar can appear to bend or crouch to simulate someone engaging more closely with the object.

The inputs directed to controlling the virtual avatar can be received by an avatar command processor 256. In response to the agent's commands, an avatar generation engine 258 can modify the appearance of the virtual avatar and other virtual objects. For example, in response to commands from the support agent 240 to move the avatar from one part of the room to another part of the room, the avatar generation engine 258 can modify the appearance of the virtual object(s) so that their shapes, sizes, and orientations match the user's viewing perspective and maintain an appropriate perspective.

The avatar generation engine 258 can receive information from a mapping module 260 that can convert the image content received from image processor 224 of the client device 210. The information generated by the mapping module 260 is shared with the avatar generation engine 258 to generate an interactive landscape in which the virtual avatar can be navigated. For example, avatar generation engine 258 may generate a virtual representation of geo-spatial floor layout corresponding to the real property or physical space associated with the customer, where features/ attributes of the real property are mapped to a virtual environment. The avatar generation engine 258 then combines the virtually mapped environment and virtual avatar in a presentation that is interactive. In other words, the avatar can now be moved through the physical environment by the support agent 240 and appear to be present in the augmented view of the physical environment as it is being seen by the customer.

In some embodiments, the generated virtual environment can include a functionality where the support agent 240 can view images of the customer's environment and make changes through use of augmented reality to how the environment would appear after adding/removing certain objects, after changing floor layouts, after demonstrating the impact of natural disasters, after adding a proposed service, after activating a feature of a device, etc. Such augmented images can provide the customer with information related to safeguarding the user's property against natural hazards, repairing parts of their home, utilizing services, and other features.

The augmented reality projection system 252 also includes provisions for receiving agent inputs and executing commands. For example, in cases where the support agent 240 is wearing an HMD system and/or VR gloves to interact with the images shared by the customer, the augmented reality projection system 252 may be configured to recognize user inputs made through head and hand gestures or other body movements or user interactions. These inputs and other position and distance related data are captured by sensors associated with the augmented reality projection system 252. In one example, a user input can comprise a button press, a specific gesture performed in view of the camera, a gaze-direction or other eye tracking movement by the support agent, a voice activation, or other recognizable input made in proximity to the presented virtual objects and digital assets, received via cameras of the HMD system. In some embodiments, a set of gestures may be stored or organized in the form of a gesture dictionary that stores movement data or patterns for recognizing gestures, including but not limited to finger-based pokes, pats, taps, pushes, guiding, flicks, turning, rotating, drawing, as well as larger scale grabbing and pulling, two hands with palms open for panning images, sign language or otherwise forming shapes with fingers, and swipes. These gestures can be provided in close proximity to, or in the direction of the apparent location of a virtual object and recognized by a gesture input processor (not shown here). The gesture or other input to the HMD system by the support agent 240 can be sent to an HMD command processor for execution of the command assigned to the recognized input.

As an example, input received via an input device 242 such as a touchscreen can be recognized as commands for navigation of the virtual projection, and processed by the avatar command processor 258, which is configured to adjust the information generated by the user interface 216 accordingly. For example, a swipe in a leftward direction on the support agent's touchscreen can convey a signal for moving the avatar in a leftward direction, while a swipe in a rightward direction on the touchscreen can convey a signal for moving the avatar in a rightward direction. Similarly, a swipe in an upward direction on the touchscreen can cause a signal to be transmitted to the customer asking that he or she move forward in the scene (for example to go nearer (or move their camera nearer) to a particular real-object), and a swipe in a downward direction on the touchscreen can cause a signal to be transmitted to the customer asking that he move backward in the scene (move the camera further away from a real-world object). In some embodiments, other types of commands can be triggered via the touchscreen or other input device 242. In one example, a 'pinch' can decrease the apparent size of the virtual avatar and/or any associated virtual objects, and a splaying outward of the same fingers can increase the apparent size of the virtual avatar and/or any associated virtual objects. In another example, a user input can be received via the touchscreen interface in the form of a tap or press and, in response, the virtual avatar can appear to interact with a nearby real object, add a label to the real object, or access additional information that may be stored in relation to that real object. In embodiments where the support agent 240 is authorized and able to directly interact with any smart devices located in the physical environment of the customer 212, a subsequent tap or press on the real object as it is shown and identified on the touchscreen can serve to open a menu of options for sending commands directly to the smart device.

In addition, in embodiments where the support agent permits the agent computing device 250 to perform image capture of the agent's face, the system can receive inputs that can be used to generate appropriate and timely facial expressions for the virtual avatar. For example, the augmented reality projection system 252 may use automatic facial recognition to encode facial expressions of the support agent. The augmented reality projection system 252 can map the facial expressions onto the avatar displayed in real-time or close to real-time, allowing a continuous, responsive, and dynamic presentation of a human-like face that matches or aligns with the message or other communication being conveyed by the support agent 240.

Furthermore, in different embodiments, the system 200 includes provisions for transmitting commands or instructions generated by the support agent to real objects near the customer. For example, the customer can authorize the support agent to interact directly with one or more smart devices 270. Smart devices 270 are connected to a network via different wireless protocols such as Bluetooth, Zigbee, NFC, Wi-Fi, LiFi, 3G, etc., can receive commands, and perform different functions and execute various operations in response to the commands. Usually such interactions are performed in the vicinity of the smart device, and/or via a user device that is configured to provide instructions to the smart device. Some examples of smart devices 270 include thermostats, lights and bulbs, speakers, appliances, locks, plugs, security systems, pet feeders, cameras, music players, media streaming devices, virtual assistants, and other such technologies. In some embodiments, the support agent 240 can access a control interface for a specific smart device in the physical space through the network connection 230. For example, customers who enable screen sharing of the client device may also provide access to the different menus for controlling smart devices from the client device and allow the support agent to remotely operate features via the client device. In another example, the smart device may be configured to receive instructions from more than one device, and the agent computing device 250 can include an interface for communicating with the smart device over the network connection 230. Such interactions will be discussed in further detail below with reference to FIGS. 8 and 9.

Figure 3:
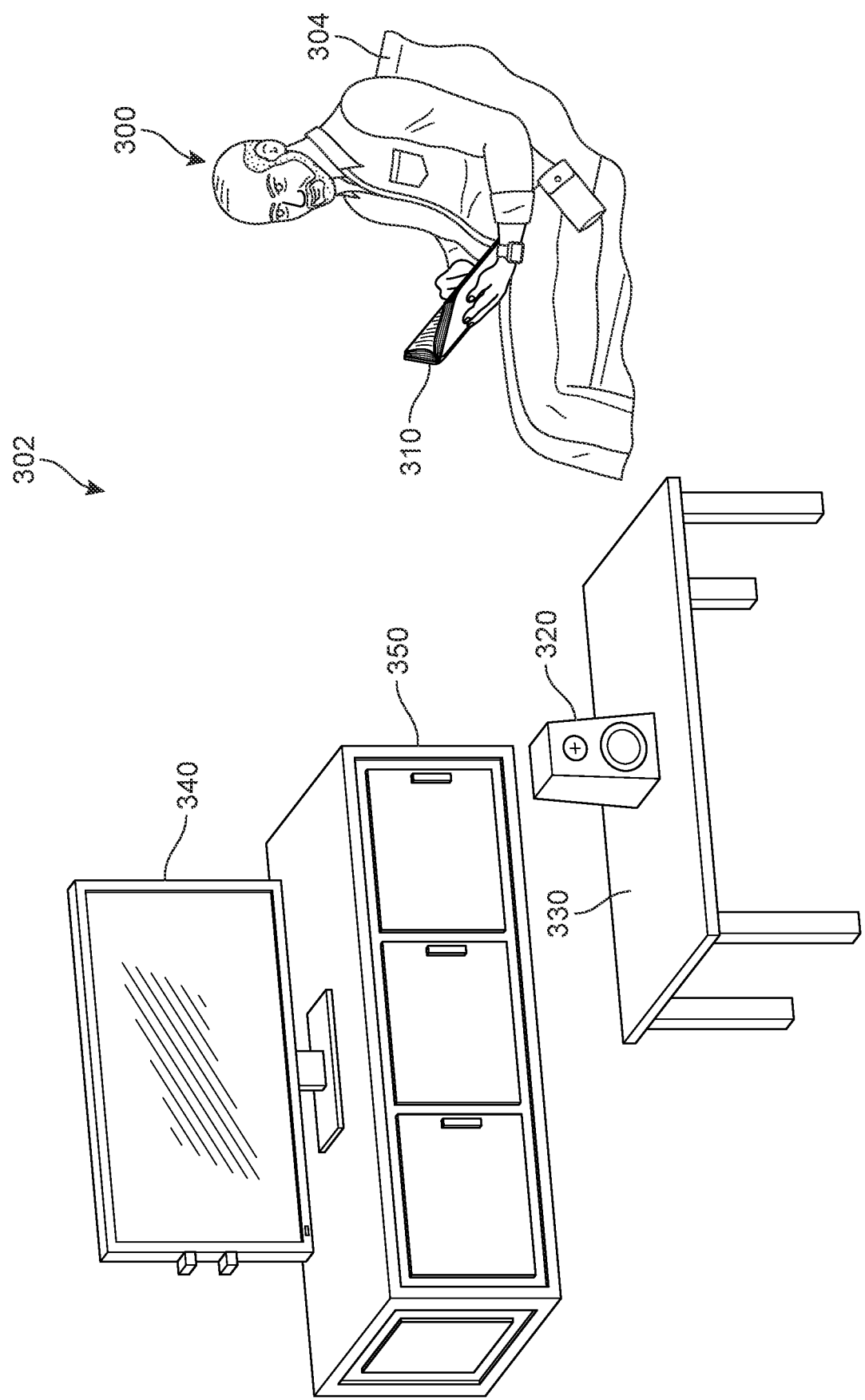
FIG. 3 is an illustration of a customer attempting to diagnose a product issue at their home, according to an embodiment.

Referring now to FIGS. 3-11, a sequence of drawings illustrates one example of a use of an augmented reality support system ("system"). In FIG. 3, a second user 300 is depicted at a first time seated on a sofa 304 in a living room space 302 while reading an instruction manual ("manual") 310. The second user 300 is attempting to connect a nearby smart speaker system 320 disposed on an adjacent table 330 to his television 340, located across from the table 330 on a television console ("console") 350. At this time, second user 300 has been thus far unsuccessful in his attempts, and decides to reach out to a support agent to help him through the set-up process.

Figure 4:
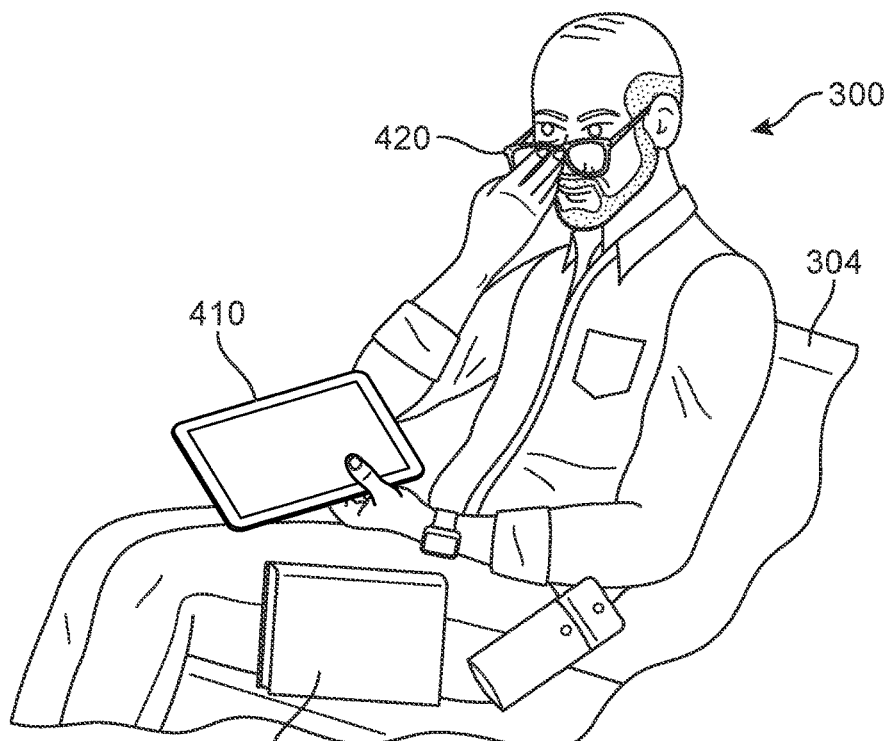
FIGS. 4 and 5 are an illustration of the customer of FIG. 3 retrieving an augmented reality system for use during a support call, according to an embodiment.
Figure 5:
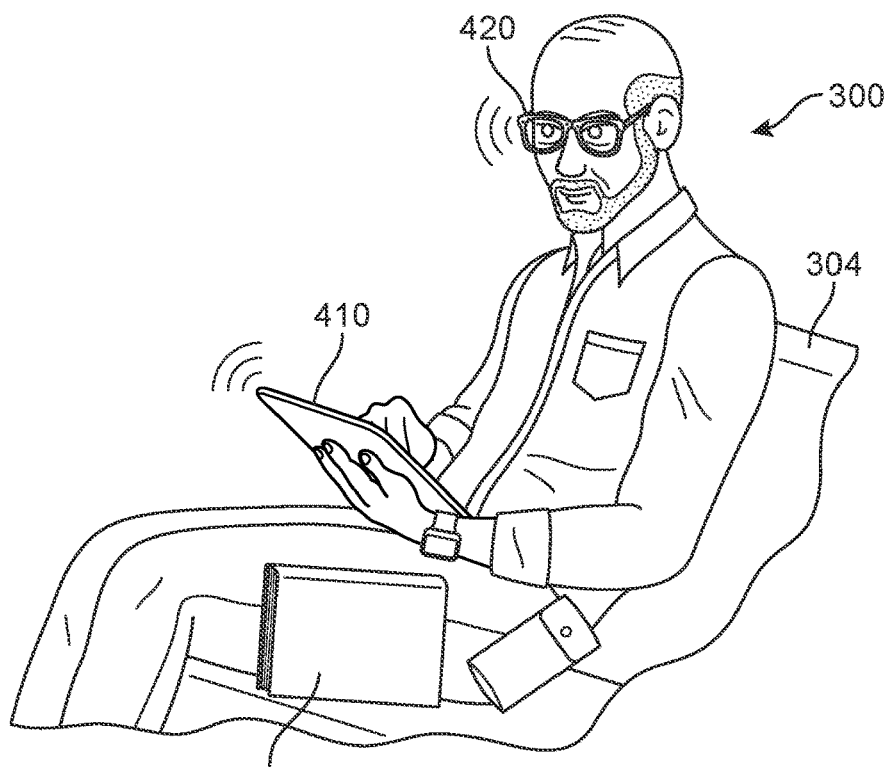
Figure 6:
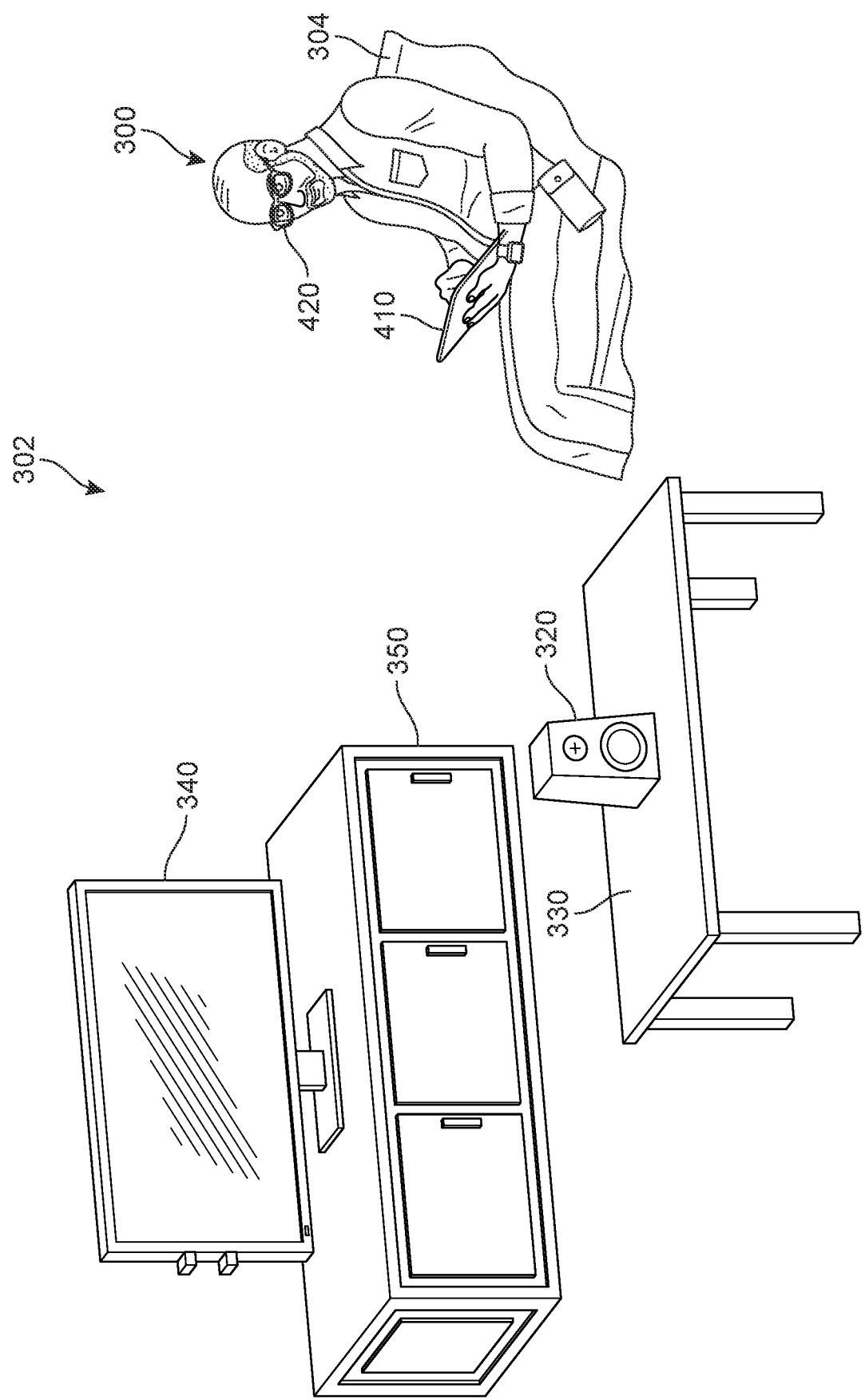
FIG. 6 is an illustration of a customer connecting to a support center while wearing a head-mounted display, according to an embodiment.

In FIG. 4, an isolated view of the second user 300 at a second time subsequent to the first time depicts the second user 300 setting aside the manual 310 and retrieving a mobile device 410 (here depicted as a tablet) and a pair of smartglasses 420. The two devices are connected and synced as shown in FIG. 5, and the second user 300 transmits a request to initiate a communication session to a customer support center, for example via a web application. In FIG. 6, the second user 300 is joined to a support agent via a network connection, turns his head toward the smart speaker system 320 and provides permissions to the remote support agent and/or the user interface provided by the support center to 'see' the images of the physical space being captured by the second user's cameras, and to receive a presentation of a virtual avatar via the HMD system associated with smartglasses 420.

Figure 7:
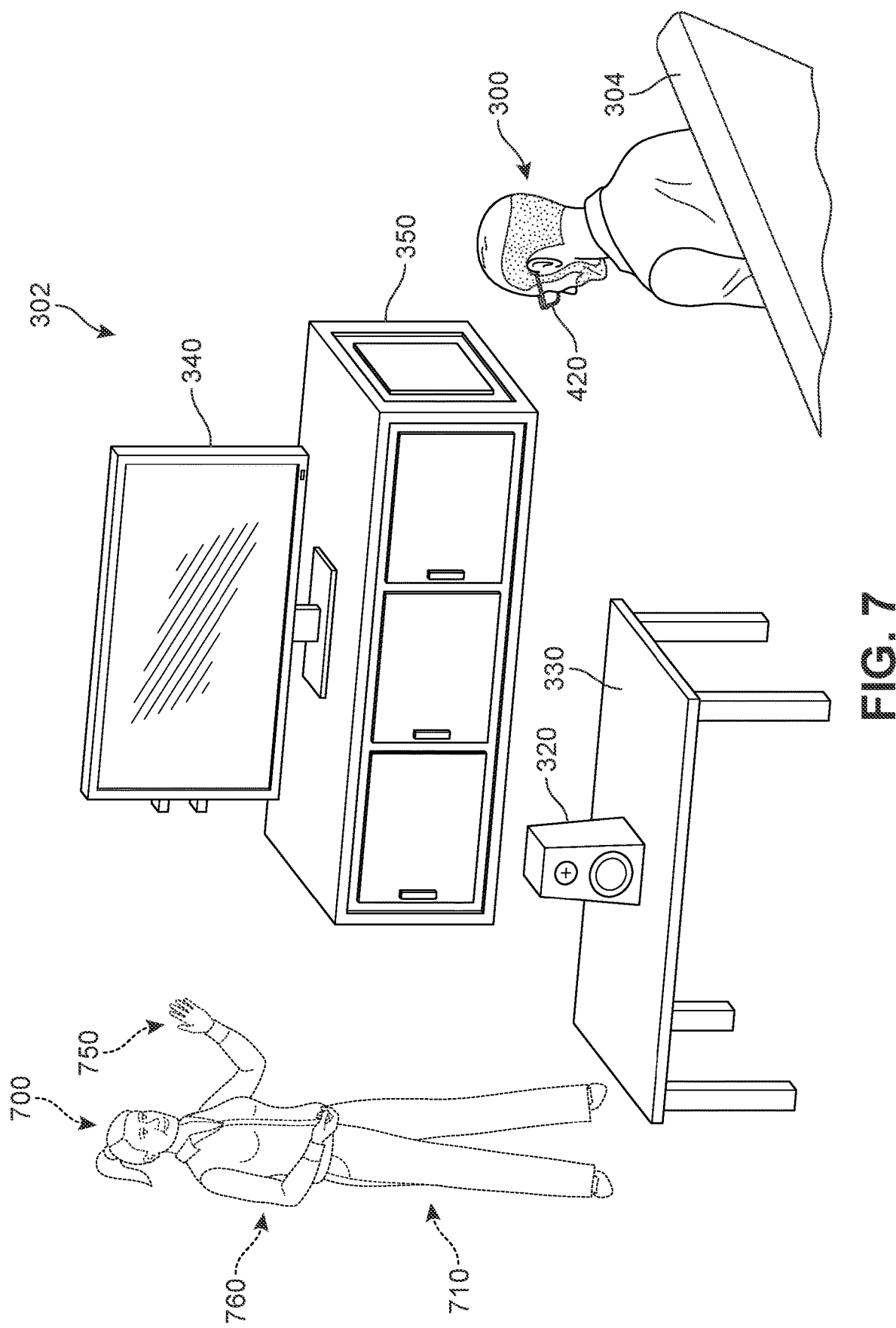
FIG. 7 is an illustration of a virtual avatar being displayed to the customer, according to an embodiment.

For purposes of illustration, in FIG. 7, the perspective of the living room 302 has been changed to allow the reader to better appreciate the experience of the second user 300 while wearing smartglasses 420. In this example, the second user 300 is still seated on sofa 304 at a third time subsequent to the second time, but a virtual avatar 700 is also being projected in a first area 760 of the living room 302 at a first relative location ("first location") 710 a few feet away from and directly in front of the second user 300, as well as 'behind' and near the table 330. The appearance of the virtual avatar 700, including its pose, are for the most part controlled by the remote support agent (who is not shown here). In other words, the support agent, at a location separate from the living room 302, submits various inputs to manipulate the appearance of the virtual avatar 700 in the eyes of the second user 300. Furthermore, while the support agent can adjust the costume, ethnicity, height, gender, accent, language, hair style, accoutrements, and other aspects of the virtual avatar via an avatar interface at their computing device, it should be understood that in some embodiments, the customer may also be able to choose or request a particular kind of feature or appearance-type for the virtual avatar with which they are more comfortable or likely to be receptive towards.

In addition, the support agent can control the pose of the virtual avatar relative to the surrounding real-world scene. For purposes of this application, a "pose" of an object refers to its estimated position and orientation in three dimensions, where position may be specified by linear measurements with respect to orthogonal 3D axes such as X, Y, and Z, and orientation may be specified by angular measurements around the 3D axes, such as by the angles $\theta_x$, $\theta_y$, and $\theta_z$, corresponding to angular measurements with respect to the X, Y, and Z axes, respectively. A pose may be indicated or specified by the vector [X, Y, Z, $\theta_x$, $\theta_y$, $\theta_z$]. It can be appreciated that in cases where the avatar has a vector that is outside of the user's field of view, and/or the user's HMD turns away, the virtual projection appears to disappear, become abridged, become less solid, or also moves outside of the user's field of view. Similarly, when the user returns to their original field of view, the virtual projection will again be visible and appear next to the same real objects in the same relative position. In other embodiments, the support agent can also configure the virtual avatar so that when the user moves their head while wearing an HMD, the virtual avatar 'keeps up' or maintains an appearance in their field of view.

In FIG. 7, the virtual avatar 700 begins by assuming a relatively neutral standing stance and expressing a greeting and appearing to wave her arm and hand to say 'hello' in a first pose 750. As the second user 300 communicates with the support agent-virtual avatar, for example, by voice, instant-chat messaging, or text-messaging, in some embodiments, the virtual avatar 700 can move and/or appear to speak the words being spoken by the live support agent, and/or appear to change facial expression. In addition, while the two people are dialoguing, the support agent can observe the image of the physical environment as seen by the second user from their remote location and identify various real objects. When the second user 300 describes their problem, question, concern, or other reason for which they are communicating with the support center, the support agent can determine whether there are any real objects in the vicinity that are related to the topic. In some embodiments, the user may permit the support agent access to purchase information (for example, price paid, date of purchase, condition of item at the time of purchase, etc.), product information (for example, brand, model or serial number, dimensions, warranty information, etc.) as well as other kinds of information regarding a specific real object in order to improve the support agent's knowledge and ability to help the user with the object. In some embodiments, the support agent views the real-world scene associated with the user and can apply various software for image recognition, feature identification, troubleshooting, damage detection, and algorithms for predicting cost estimates for repairing and/or replacing objects. The software for these analyses may be run on the servers of support center, on the agent's remote device and/or may be distributed across both. Optionally, some types of analyses may be run via a separate cloud service.

The embodiments may make use of any known methods, techniques, or algorithms in machine vision and feature detection to identify and classify objects. Embodiments may use any known image processing methods such as stitching/ registration, filtering, thresholding, pixel counting, segmentation, edge detection, color analysis, blob detection, pattern recognition or template matching, optical character recognition as well as other known methods. Some embodiments may use the scale-invariant feature transform (SIFT) algorithm that is used in object recognition, robotic mapping and image stitching. Embodiments can also make use of any known methods, techniques, or algorithms in robotics and/or navigation. For example, some embodiments may utilize the well-known simultaneous localization and mapping (SLAM) technique for constructing and updating a map of an unknown environment and determining the location of an agent within the map. Some implementations of SLAM can be used to help determine distances between objects, or dimensions of objects, within an image. In one embodiment, the agent may have the ability to apply software to identify the geographic region of the customer and look-up prices for parts and/or labor for that geographic region related to the object(s) of interest to the user.

In this case, the support agent is able to remotely 'see' the speaker system 320 through a camera installed on the second user's HMD that is transmitting images in real-time to the agent's computing device. The second user 300 may reiterate his difficulty in activating the speaker system 320. The support agent can observe the object(s) associated with issue directly with the second user 300, as if they are present in the room with the second user 300. Such a presentation can be particularly helpful for users such as the elderly or those who do not speak a language fluently, to allow them to simply point at a real object and ask questions about it, including pointing to different surfaces and portions and referring to such portions as "that" or "this" rather than being expected to describe in words the portion of the device they are seeking help with.

Figure 8:
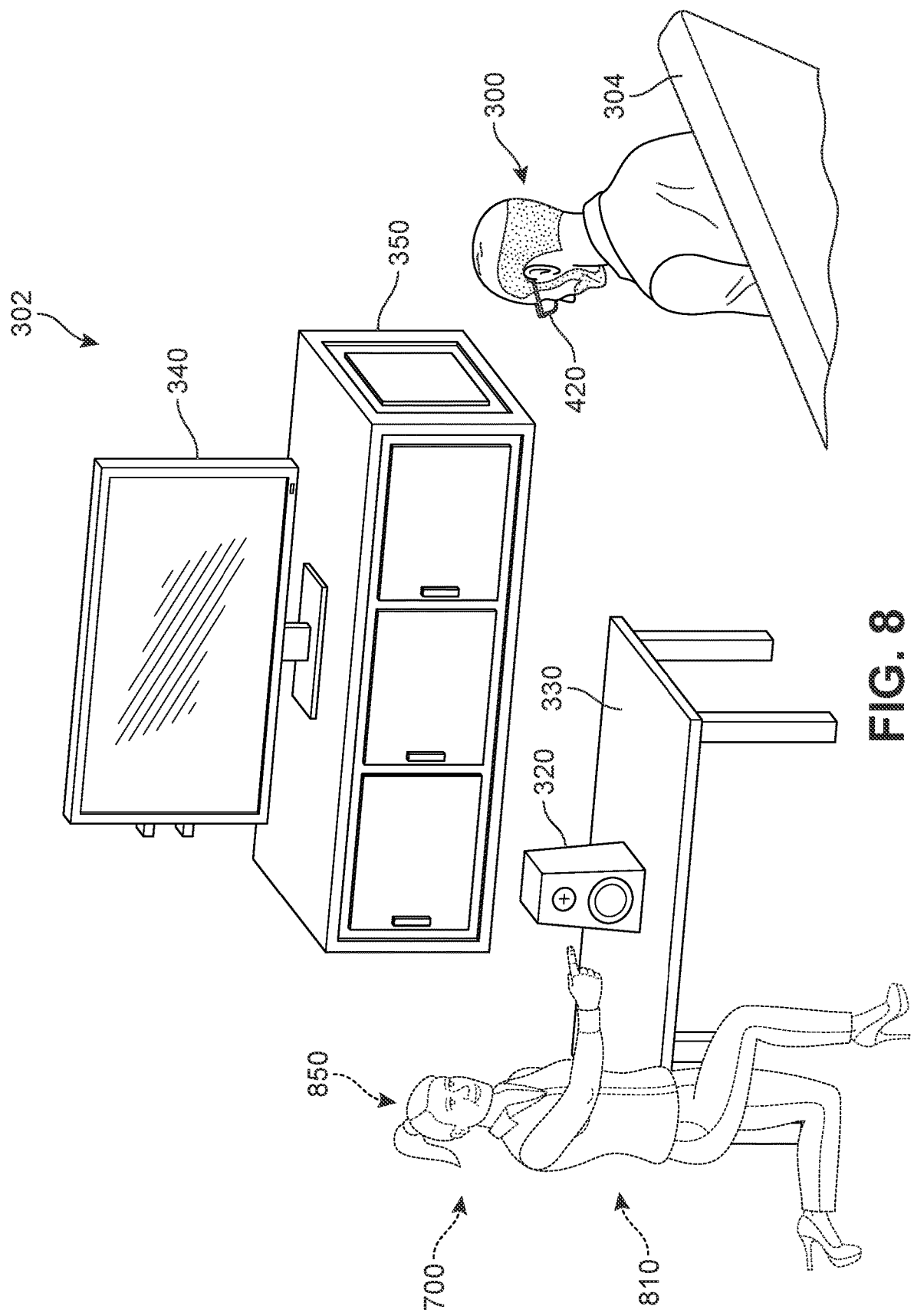
FIG. 8 is an illustration of the virtual avatar moving nearer to a first object in the physical space around the customer, according to an embodiment.

From the agent's computing device, the support agent is also able to move the virtual avatar closer toward the speaker system 320. In FIG. 8, at a fourth time subsequent to the third time, the virtual avatar 700 has shifted to a second relative location ("second location") 810 that appears to be slightly closer to table 330 and the speaker system 320. In addition, the virtual agent 710 is in a second pose 850 in which she is appearing to crouch and turn her virtual face toward the speaker system 320. During this transition, the support agent informs the second user 300 that she is assessing the model and type of speaker system, and obtaining additional information to help her better understand and troubleshoot the issue. In some embodiments where the speaker system 320 is a smart device, the support agent can initiate a connection or access an interface from which she can adjust various operational parameters of the speaker system 320 and/or view and change settings and activate or deactivate features of the device.

Figure 9:
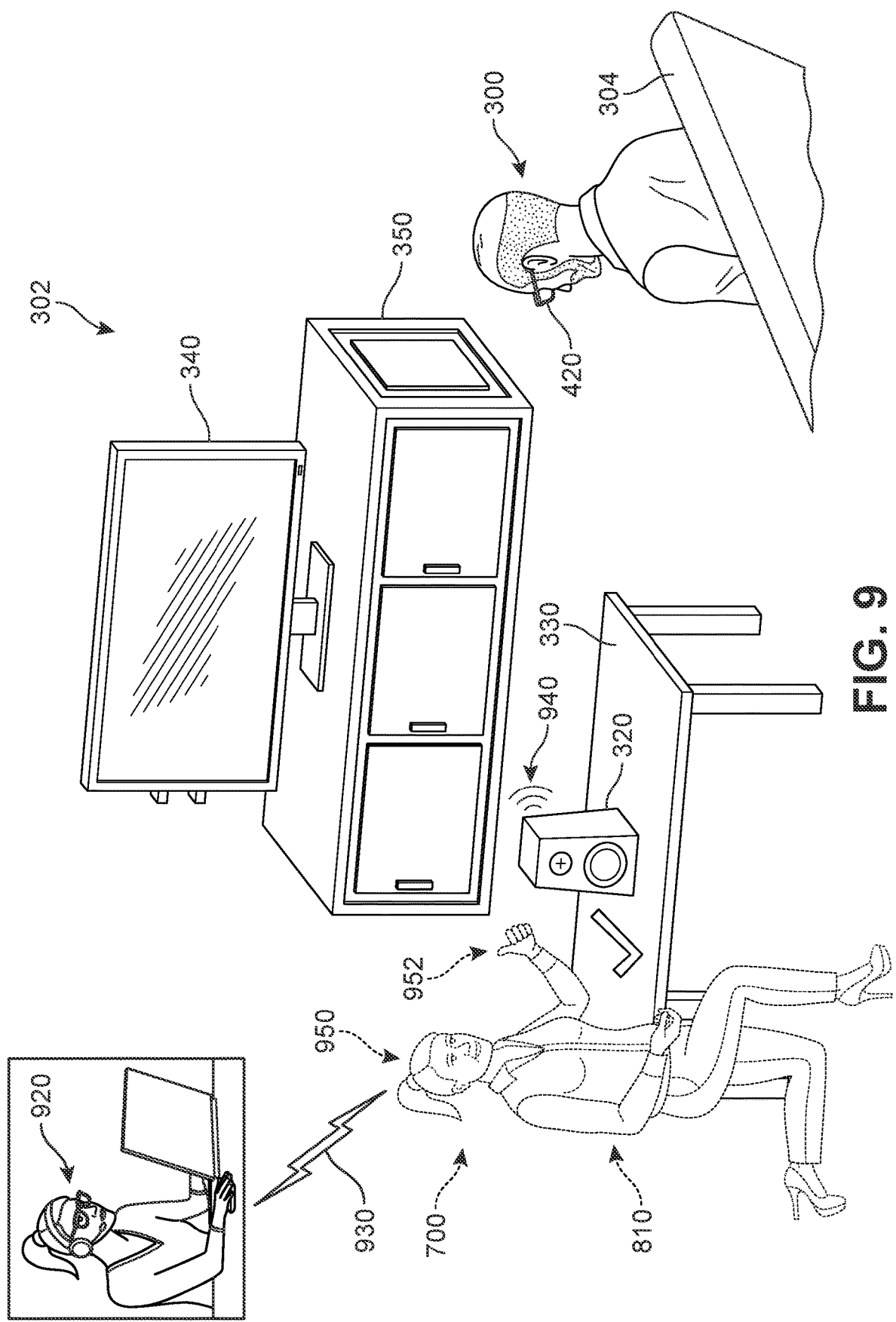
FIG. 9 is an illustration of a remote support agent transmitting a command to the object, according to an embodiment.

In FIG. 9, for purposes of clarity, a depiction of a support agent 920 at a remote location is shown as she inputs and transmits a command 930, via her own computing device, to the speaker system 320. In response to her command, at a fifth time subsequent to the fourth time, the speaker system 320 successfully connects, links, or pairs 940 with the television 340. The virtual avatar 700 turns to face the second user 300 and smile, changing to a third pose 950 in which she appears to give a 'thumbs up' gesture 952. The second user 300 is able to see this through his HMD, follow the steps that were taken by the support agent 920, and more readily understand and learn the process for himself.

Figure 10:
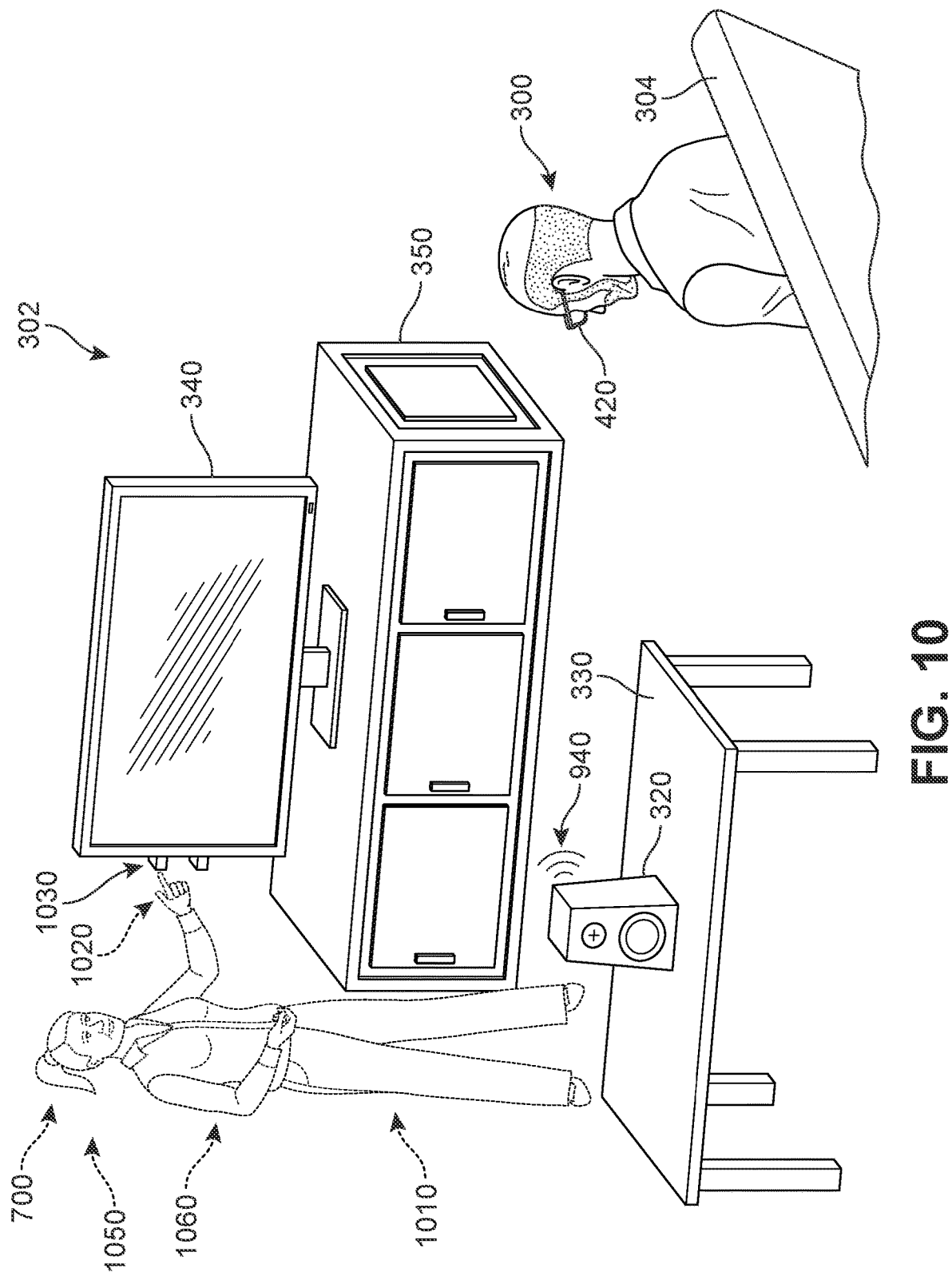
FIG. 10 is an illustration of the virtual avatar moving near to a second object in the physical space around the customer, according to an embodiment.

In different embodiments, for example in response to a request from second user 300 to assist him with a secondary issue, or as a natural continuation of the previous issue, the virtual avatar 700 may appear to walk or otherwise approach another real object in the physical space or into an adjoining space to provide information relating to that real object. The second user 300 may move his head to 'follow' or even get up and move himself to compensate for the virtual avatar's movement, and/or to facilitate the support agent's viewing and access to additional real objects in nearby spaces. In FIG. 10, at a sixth time subsequent to the fifth time, the virtual avatar 700 has walked toward television 340 and console 350 to reach a third relative location ("third location") 1010 that is in a second area 1060 of the living room 302. The second user 300 has also turned in his seat to better view the second area 1060. As she begins to provide information that relates to the television 340, the support agent can change the pose of the virtual avatar 700 to a fourth pose 1050 where she appears to be standing directly adjacent to the console 350 and to a side of the television 340 where she can move her hand 1020 toward a set of buttons 1030 disposed on the television 340. In this case, the television 340 is not a smart device, so the virtual avatar 700 simply offers information while pointing to the specific portions of the television that correspond to her guidance. For example, she can indicate which button or series of buttons to press in order to switch the television to a different audio mode through gestures made by the virtual avatar 700. Physically demonstrating the steps that need to be performed to adjust the device may facilitate better learning for the user observing this interaction, as compared to having the process simply "explained" over the phone.

Figure 11:
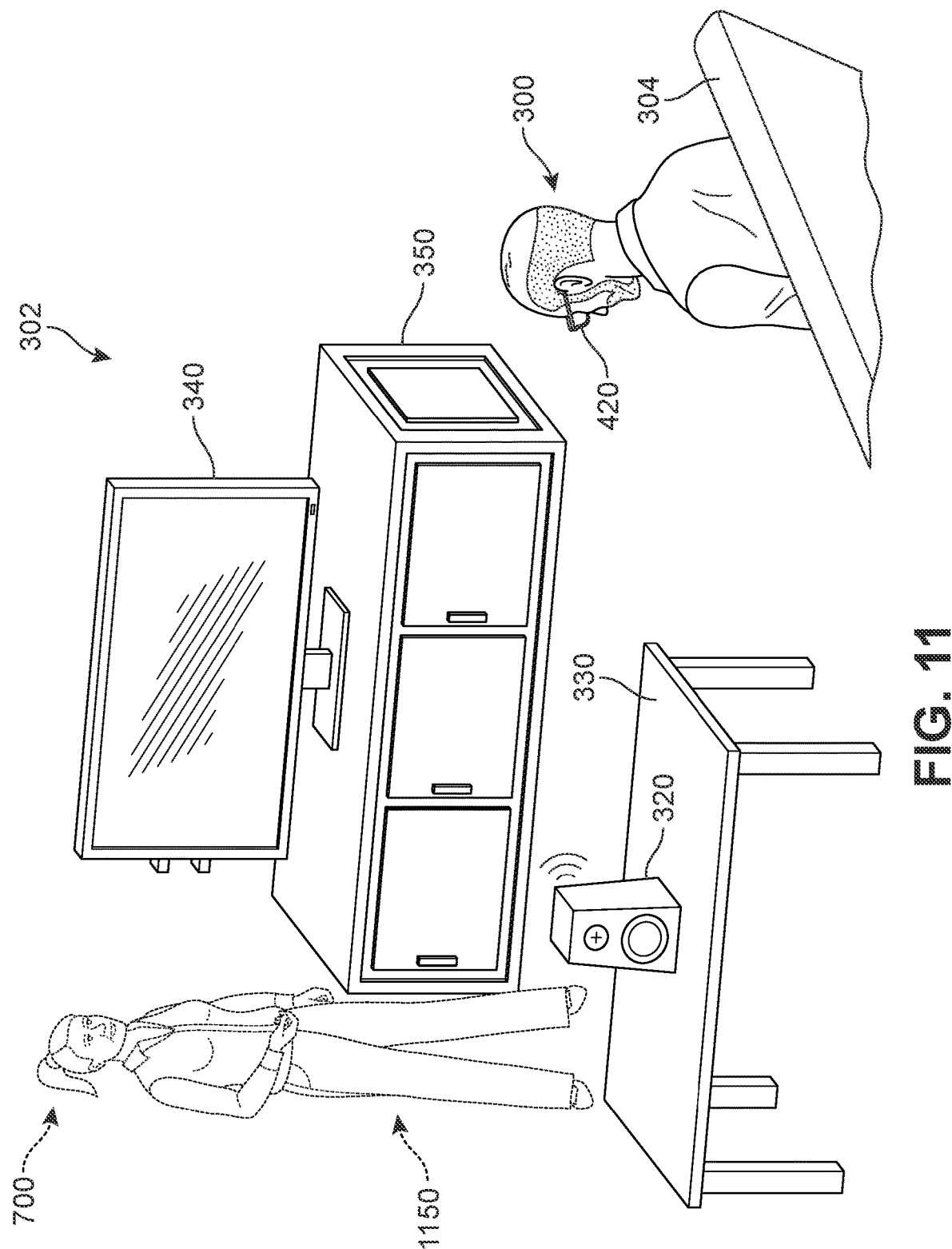
FIG. 11 is an illustration of a virtual avatar concluding the support call, according to an embodiment.

In FIG. 11, at a seventh time subsequent to the sixth time, once the questions from the second user 300 have been addressed, the support agent or second user 300 can conclude the communication session. In some embodiments, the virtual agent 700 will assume a fifth pose 1150 that is more formal or neutral (e.g., hands clasped in front of her, standing up straighter, etc.) in order to indicate to the second user 300 that she is 'wrapping up' or that the session is coming to a close. In other embodiments, the virtual avatar 700 may appear to wave goodbye, fade, or otherwise disappear from view in the HMD of the second user 300, confirming the termination of the communication session, or at least of the virtual avatar aspect of the session.

Figure 12:
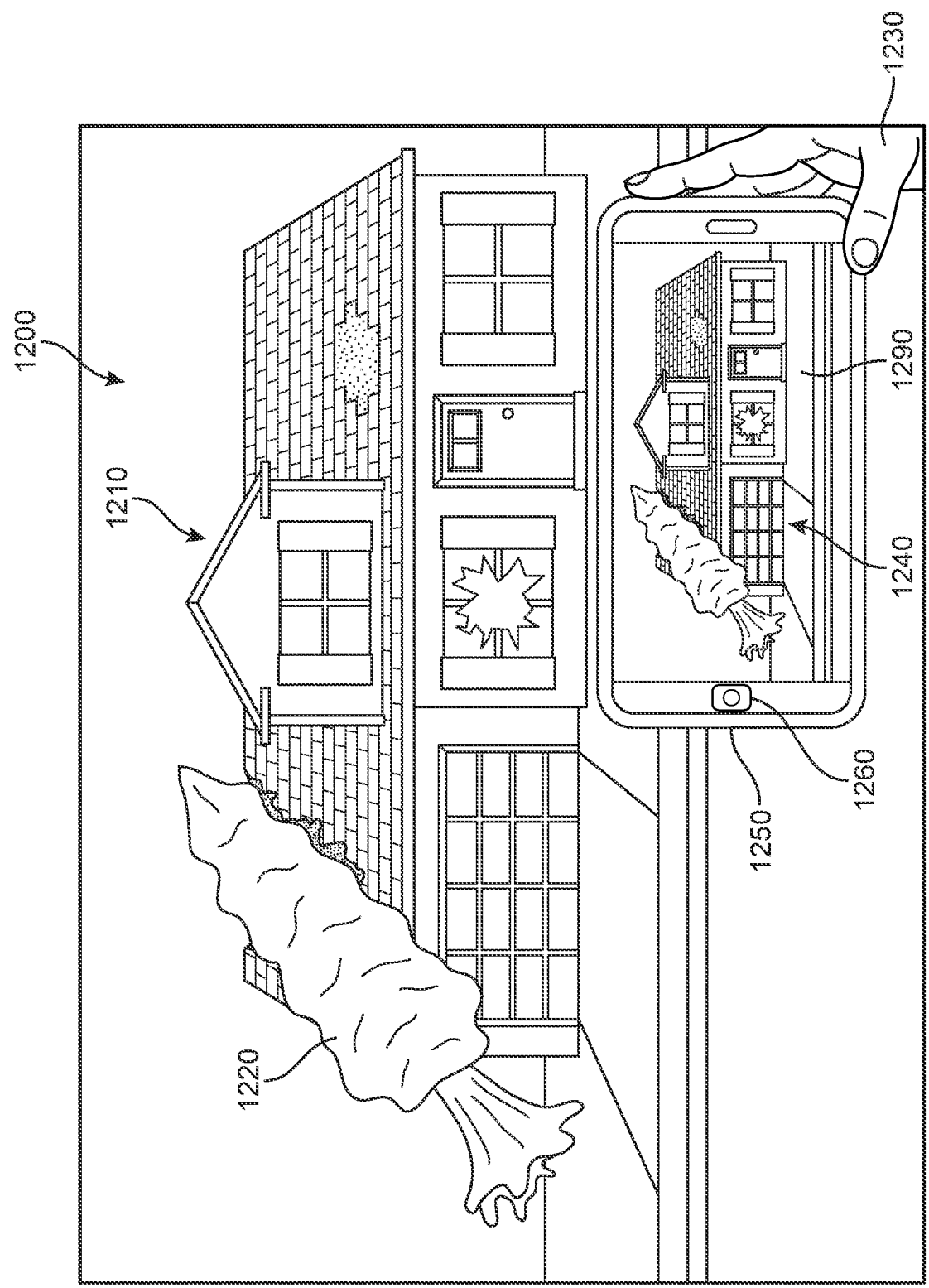
FIG. 12 is an illustration of a mobile device capturing an image of a residence.

In different embodiments, the system can be configured to perform similar functions as described with reference to FIGS. 3-11 but without the use of an HMD. For purposes of illustration, FIG. 12 depicts an example in which an outside physical environment 1200 including a residence 1210 that has been damaged by a tree 1220 is being viewed. A third user 1230 (represented by a hand) is facing toward the residence 1210 while holding a mobile device 1250 with a camera 1260 capturing an image 1240 of the real-world scene, here shown on a display 1290 of mobile device 1250. The third user 1230 can provide this image to an MSR or other support agent through a customer interface, and the image 1240 can be mapped to allow for the introduction of virtual objects that may be overlaid onto the real-world scene.

Figure 13:
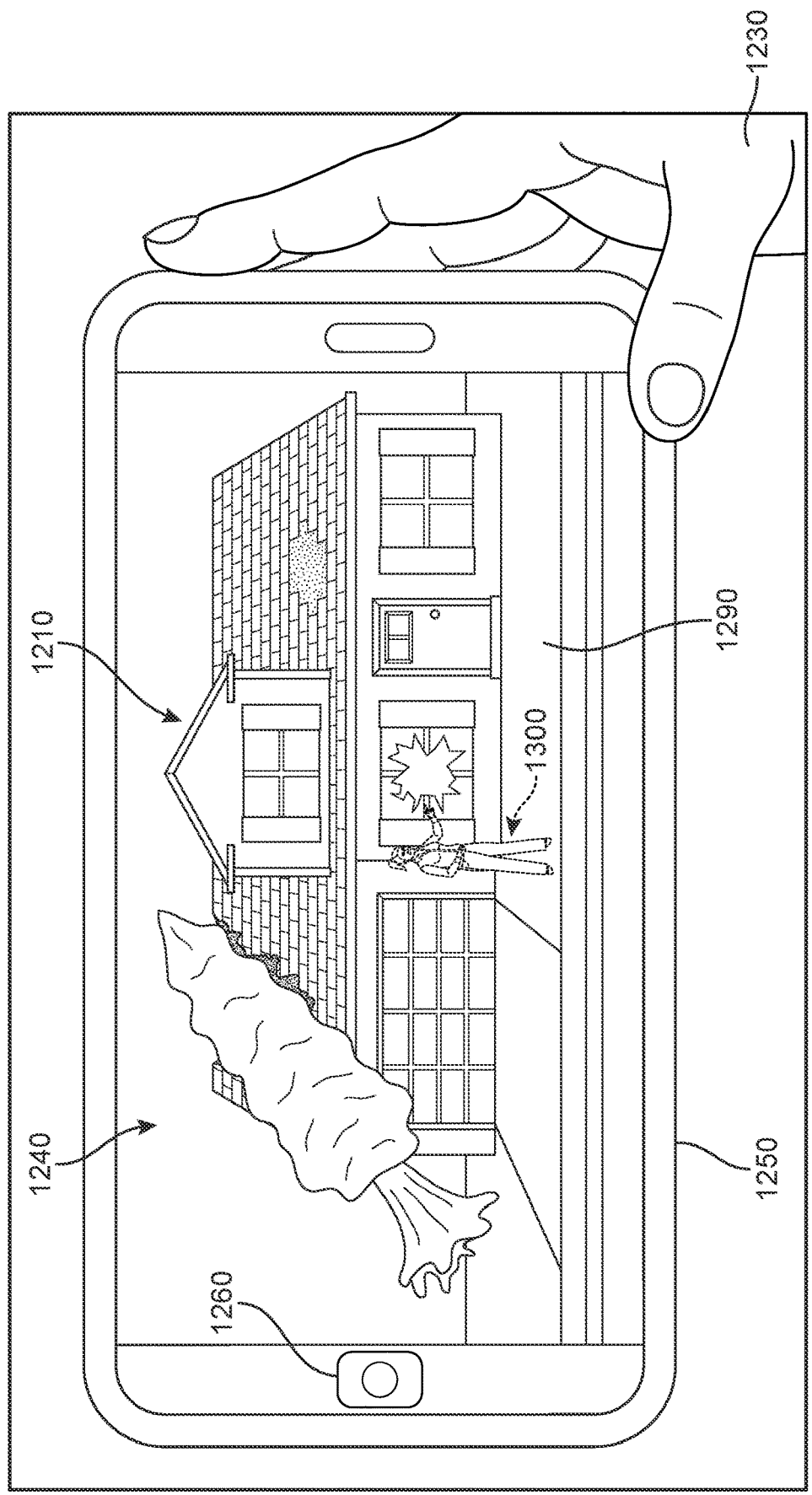
FIG. 13 is an illustration of a virtual avatar being displayed to the customer overlaid on the image of the residence of FIG. 12, according to an embodiment.

This is reflected in FIG. 13, where a support agent can request the generation of a second virtual avatar ("second avatar") 1300 to be projected onto the image 1240. In some embodiments, the image 1240 can be static, and the second avatar 1300 simply moves across the image and can appear to 'stand' adjacent to specific features or portions of the residence 1210 while she discusses an issue related to that specific portion. In other embodiments, the image 1240 can represent a live-streaming video that is being shared with the support agent and the virtual avatar interacts with the dynamic images in real-time as the third user 1230 changes the orientation or position of their camera 1260. The third user 1230 can be provided with an apparent 'walkthrough' or step by step guidance with a virtual agent even when the third user 1230 is away from home and/or without an HMD system, simply by sharing the images captured by their personal computing devices.

Figure 14:
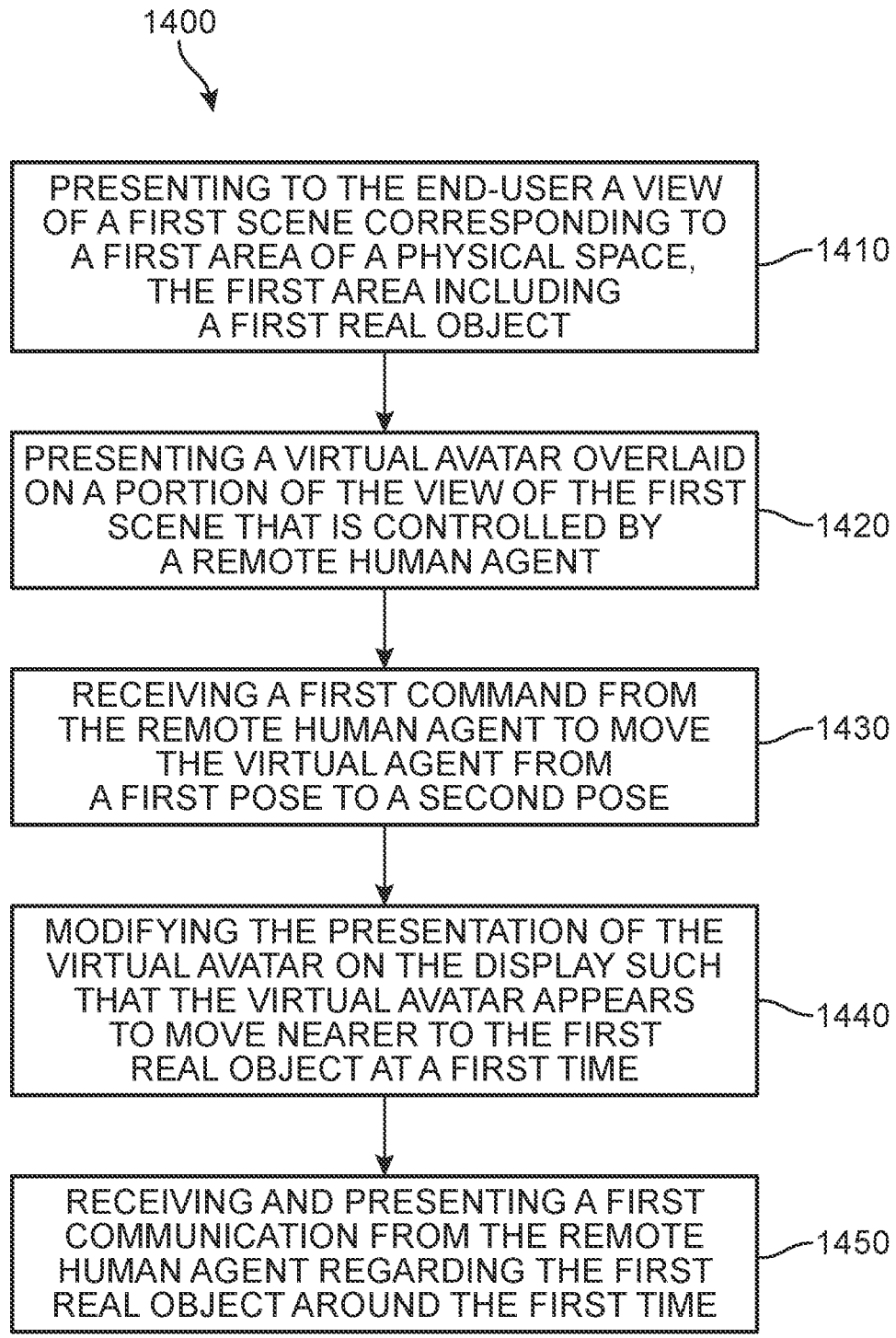
FIG. 14 is a flow diagram of a process for providing assistance to a customer using an augmented reality system, according to an embodiment.

FIG. 14 is a flow chart illustrating an embodiment of a method 1400 for conveying interactive guidance to an end-user. The method 1400 includes a first step 1410 of presenting to the end-user, on a display of a first computing device, an image of a first scene corresponding to a first area of a physical space. The first area includes at least a first real object. A second step 1420 includes presenting a virtual avatar on the display, where the virtual avatar is overlaid on a portion of the first scene. In addition, the virtual avatar is controlled by a remote human agent via a second computing device. A third step 1430 includes receiving a first command from the remote human agent to move the virtual agent from a first pose to a second pose, and a fourth step 1440 includes modifying, in response to the first command, the presentation of the virtual avatar on the display such that the virtual avatar appears to move nearer to the first real object at a first time. A fifth step 1450 includes receiving and presenting a first communication from the remote human agent regarding the first real object around the first time.

In other embodiments, the method may include additional steps or aspects. In one embodiment, the first real object is a smart device, and the method further involves transmitting a signal to the first real object from the second computing device for adjusting a functionality or operation of the first real object while the first scene is being presented on the display. In another embodiment, the first scene corresponds to a field of view of a camera being worn or held by (or otherwise in the custody of) the end-user. In some embodiments, the virtual avatar appears to be pointing to a first portion of the first real object around the first time.

In another example, the method also includes modifying the presentation of the virtual avatar on the display such that the virtual avatar appears to point to a second portion of the first real object at a second time subsequent to the first time, and then receiving a second communication from the remote human agent around the second time, the second communication regarding a feature associated with the second portion of the first real object. In some embodiments, the method also includes presenting, on the display of the first computing device, an image of a second scene corresponding to a second area of the physical space, and modifying the presentation of the virtual avatar on the display such that the virtual avatar appears to move from the first area to the second area.

In some other examples, the second area includes a second real object, and the method further includes steps of modifying the presentation of the virtual avatar on the display such that the virtual avatar appears to point to the second real object at a second time subsequent to the first time, and receiving a second communication from the remote human agent around the second time, the second communication including information about the second real object. In one embodiment, the first communication is an instruction about an operational feature of the first real object. In some embodiments, the first communication can include a recitation of a step or steps of a process for operating a device in the physical space, where the virtual avatar assumes a variety of gestures, including pointing, to portions or features of the device related to the process concurrently with the recitation of the steps. Thus, if the physical space has smart devices, the projection of the virtual agent can appear to interact with that space by turning on/off devices. In some embodiments, the projection of the avatar can point to physical features to explain things to the user, or even request that the user perform a task, such as opening a door for further inspection. In one example, a virtual avatar could show an elderly user how to adjust a complicated smart device, like a smart thermostat.

In another embodiment, the first real object is a door or panel cover, and the first communication includes a request to the end-user to open the door or panel cover. In some embodiments, the first real object is electronic, and the first communication includes a request to supply power to the first real object. In one example, the first computing device includes a head-mounted display system. Furthermore, in some embodiments, the method also includes mapping, prior to the presentation of the virtual avatar, a representation of at least the first area of the three-dimensional physical space, for example based on images captured by a camera associated with the first computing device.

Other methods can also be contemplated within the scope of this disclosure. For example, a method of for generating guidance using a virtual avatar may be provided. The method can include a first step of receiving, at a first computing device, one or more images of a first scene corresponding to a first area of a physical space from a second computing device, the first area including a first real object, and a second step of mapping a representation of the first scene based at least in part on the received images. The method also includes a third step of presenting the representation of the first scene on a first display of a first computing device, and a fourth step of overlaying a projection of a virtual avatar on a portion of the representation of the first scene, where the virtual avatar is being controlled by an end-user who is remote relative to the physical space. Furthermore, the method includes a fifth step of receiving, at the first computing device, a first command to move the virtual avatar from a first location near the first real object to a second location further from the first real object, and a sixth step of moving, in response to receiving the first command, the virtual avatar from the first location to the second location.

In other embodiments, this method may include additional steps or aspects. In one embodiment, the method also involves receiving, at the first computing device, a message from the second computing device including a question about a second real object disposed in the first area, as well as receiving, at the first computing device, a second command to move the virtual avatar from the second location to a third location adjacent to the second real object, and then moving, in response to receiving the second command, the virtual avatar from the second location to the third location.

In some embodiments, the method may also include receiving, at the first computing device, a second command to alter a pose of the virtual avatar from a first pose in which the virtual avatar is standing to a second pose in which the virtual avatar is crouching, and altering, in response to receiving the second command, the pose of the virtual avatar from the first pose to the second pose. In another example, the method can include sending, from the first computing device, a message to the second computing device including instructions about how to operate a feature of the first real object, and also transmitting, from the first computing device and concurrently with the sending of the message, a signal to the second computing device for presentation of the virtual avatar on a second display of the second computing device. In one embodiment, the method may also involve receiving, at the first computing device, information about a facial expression of the end-user, and then mapping the facial expression to a face of the virtual avatar.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for conveying interactive guidance to an end-user, the method comprising:
   presenting to the end-user, on a display of a first computing device, a view of a first scene corresponding to a first area of a physical space, the first area including a first real object;
   presenting a virtual avatar on the display, the virtual avatar being overlaid on a portion of the view of the first scene, wherein the virtual avatar is controlled by a remote human agent via a second computing device;
   receiving a first command from the remote human agent to move the virtual agent from a first pose to a second pose;
   modifying, in response to the first command, the presentation of the virtual avatar on the display such that the virtual avatar appears to move nearer to the first real object at a first time; and
   receiving and presenting a first communication from the remote human agent regarding the first real object around the first time.

2. The method of claim 1, wherein the first real object is a smart device, and the method further comprises transmitting a signal to the first real object from the second computing device for adjusting an operational setting of the first real object while the first scene is being presented on the display.

3. The method of claim 1, wherein the first scene corresponds to a field of view of a camera being worn or held by the end-user.

4. The method of claim 1, wherein the virtual avatar appears to be pointing to a first portion of the first real object around the first time.

5. The method of claim 4, further comprising:
   modifying the presentation of the virtual avatar on the display such that the virtual avatar appears to point to a second portion of the first real object at a second time subsequent to the first time; and
   receiving a second communication from the remote human agent around the second time, the second communication regarding a feature associated with the second portion of the first real object.

6. The method of claim 1, further comprising:
   presenting, on the display of the first computing device, an image of a second scene corresponding to a second area of the physical space; and
   modifying the presentation of the virtual avatar on the display such that the virtual avatar appears to move from the first area to the second area.

7. The method of claim 6, wherein the second area includes a second real object, and the method further comprises:
   modifying the presentation of the virtual avatar on the display such that the virtual avatar appears to point to the second real object at a second time subsequent to the first time; and
   receiving a second communication from the remote human agent around the second time, the second communication including information about the second real object.

8. The method of claim 1, wherein the first communication is an instruction about an operational feature of the first real object.

9. The method of claim 1, wherein the first real object is a door, and the first communication includes a request to open the door.

10. The method of claim 1, wherein the first computing device includes a head-mounted display system.

11. The method of claim 1, further comprising:
    mapping, prior to the presentation of the virtual avatar, a representation of at least the first area of the physical space based on images captured by a camera associated with the first computing device.

12. A method for generating guidance using a virtual avatar, the method comprising:
    receiving, at a first computing device, one or more images of a first scene corresponding to a first area of a physical space from a second computing device, the first area including a first real object;
    mapping a representation of the first scene based at least in part on the received images;
    presenting the representation of the first scene on a first display of a first computing device;
    overlaying a projection of a virtual avatar on a portion of the representation of the first scene, the virtual avatar being controlled by an end-user who is remote relative to the physical space;
    receiving, at the first computing device, a first command to move the virtual avatar from a first location near the first real object to a second location further from the first real object; and
    moving, in response to receiving the first command, the virtual avatar from the first location to the second location.

13. The method of claim 12, further comprising:
    receiving, at the first computing device, a message from the second computing device including a question about a second real object disposed in the first area;
    receiving, at the first computing device, a second command to move the virtual avatar from the second location to a third location adjacent to the second real object; and
    moving, in response to receiving the second command, the virtual avatar from the second location to the third location.

14. The method of claim 12, further comprising:
    receiving, at the first computing device, a second command to alter a pose of the virtual avatar from a first pose in which the virtual avatar is standing to a second pose in which the virtual avatar is crouching; and
    altering, in response to receiving the second command, the pose of the virtual avatar from the first pose to the second pose.

15. The method of claim 12, further comprising:
sending, from the first computing device, a message to the second computing device including instructions about how to operate a feature of the first real object; and
transmitting, from the first computing device and concurrently with the sending of the message, a signal to the second computing device for presentation of the virtual avatar on a second display of the second computing device.

16. The method of claim 12, further comprising:
receiving, at the first computing device, information about a facial expression of the end-user; and
mapping the facial expression to a face of the virtual avatar.

17. A system for conveying interactive guidance to an end-user, the system comprising:
a processor;
machine-readable media including instructions which, when executed by the processor, cause the processor to:
present to the end-user, on a display of a first computing device, an image of a first scene corresponding to a first area of a physical space, the first area including a first real object;
present a virtual avatar on the display, the virtual avatar being overlaid on a portion of the first scene, wherein the virtual avatar is controlled by a remote human agent via a second computing device;
receive a first command from the remote human agent to move the virtual agent from a first pose to a second pose;
modify, in response to the first command, the presentation of the virtual avatar on the display such that the virtual avatar appears to move nearer to the first real object at a first time; and
receive and present a first communication from the remote human agent regarding the first real object around the first time.

18. The system of claim 17, wherein the first real object is a smart device, and the method further comprises transmitting a signal to the first real object from the second computing device for adjusting an operational setting of the first real object while the first scene is being presented on the display.

19. The system of claim 17, wherein the first scene corresponds to a field of view of a camera being worn or held by the end-user.

20. The system of claim 17, wherein the virtual avatar appears to be pointing to a first portion of the first real object around the first time.

* * * * *